US007696437B2

(12) United States Patent  
Clark et al.

(10) Patent No.: US 7,696,437 B2
(45) Date of Patent: Apr. 13, 2010

(54) TELECOMMUNICATIONS CABLE

(75) Inventors: William T. Clark, Leominster, MA (US); Joseph Dellagala, Shrewsbury, MA (US)

(73) Assignee: Belden Technologies, Inc., St. Louis, MO (US)

( * ) Notice: Subject to any disclaimer, the term of this patent is extended or adjusted under 35 U.S.C. 154(b) by 96 days.

(21) Appl. No.: 11/859,181

(22) Filed: Sep. 21, 2007

(65) Prior Publication Data

US 2008/0073105 A1 Mar. 27, 2008

Related U.S. Application Data

(60) Provisional application No. 60/846,142, filed on Sep. 21, 2006.

(51) Int. Cl.  
*H01B 7/00* (2006.01)

(52) U.S. Cl. ............................ 174/110 R; 174/113 R; 174/120 R; 174/121 A

(58) Field of Classification Search ............ 174/110 R, 174/110 F, 110 AR, 110 FC, 113 R, 116, 174/120 R, 112

See application file for complete search history.

(56) References Cited

U.S. PATENT DOCUMENTS

| | | | |
|---|---|---|---|
| 3,013,109 A * | 12/1961 | Gorman et al. ......... | 174/113 R |
| 3,176,065 A | 3/1965 | Alexander et al. | |
| 3,328,510 A | 6/1967 | White | |
| 3,361,871 A | 1/1968 | Brandt | |
| 3,823,255 A | 7/1974 | La Gase et al. | |
| 3,945,974 A | 3/1976 | Schwarcz et al. | |
| 4,034,148 A | 7/1977 | Lang | |
| 4,154,976 A | 5/1979 | Brorein | |
| 4,319,940 A | 3/1982 | Arroyo et al. | |
| 4,401,845 A | 8/1983 | Odhner et al. | |
| 4,412,094 A | 10/1983 | Dougherty et al. | |
| 4,447,122 A | 5/1984 | Sutehall | |
| 4,487,992 A | 12/1984 | Tomita | |
| 4,500,748 A | 2/1985 | Klein | |
| 4,510,348 A | 4/1985 | Arroyo et al. | |
| 4,514,466 A | 4/1985 | Leon, Jr. et al. | |
| 4,549,041 A | 10/1985 | Shingo et al. | |
| 4,568,401 A | 2/1986 | Davis | |
| 4,575,184 A | 3/1986 | Ueno et al. | |
| 4,595,793 A | 6/1986 | Arroyo et al. | |
| 4,605,818 A | 8/1986 | Arroyo et al. | |
| 4,683,349 A | 7/1987 | Takebe | |
| 4,697,051 A | 9/1987 | Beggs et al. | |
| 4,755,629 A | 7/1988 | Beggs et al. | |
| 4,892,683 A | 1/1990 | Naseem | |
| 5,010,210 A | 4/1991 | Sidi et al. | |
| 5,015,800 A * | 5/1991 | Vaupotic et al. ............ | 174/34 |
| 5,097,099 A | 3/1992 | Miller | |

(Continued)

FOREIGN PATENT DOCUMENTS

CA 1164064 3/1984

(Continued)

*Primary Examiner*—William H Mayo, III  
(74) *Attorney, Agent, or Firm*—Lando & Anastasi, LLP

(57) ABSTRACT

A telecommunications cable having a cable core in which each conductor is surrounded by an individual dual layer insulation of an inner layer of flame retardant polyolefin and an outer layer of another material, for example, fluorinated ethylene propylene, MFA, PVDF, ECTFE, PTFE, or foamed PFA.

18 Claims, 5 Drawing Sheets

U.S. PATENT DOCUMENTS

| | | | |
|---|---|---|---|
| 5,142,100 A | 8/1992 | Vaupotic | |
| 5,162,609 A | 11/1992 | Adriaenssens et al. | |
| 5,202,946 A | 4/1993 | Hardin et al. | |
| 5,220,130 A | 6/1993 | Walters | |
| 5,245,134 A * | 9/1993 | Vana et al. | 174/117 F |
| 5,253,317 A | 10/1993 | Allen et al. | |
| 5,281,764 A * | 1/1994 | King et al. | 174/112 |
| 5,283,390 A | 2/1994 | Hubis et al. | |
| 5,286,924 A | 2/1994 | Loder et al. | |
| 5,358,991 A | 10/1994 | O'Brien | |
| 5,493,071 A | 2/1996 | Newmoyer | |
| 5,514,837 A | 5/1996 | Kenny et al. | |
| 5,525,757 A | 6/1996 | O'Brien | |
| 5,544,270 A | 8/1996 | Clark et al. | |
| 5,563,377 A * | 10/1996 | Arpin et al. | 174/121 A |
| 5,576,515 A | 11/1996 | Bleich et al. | |
| 5,606,151 A | 2/1997 | Siekierka et al. | |
| 5,619,016 A | 4/1997 | Newmoyer | |
| 5,658,406 A * | 8/1997 | Walling et al. | 156/51 |
| 5,666,452 A | 9/1997 | Deitz, Sr. et al. | |
| 5,670,748 A | 9/1997 | Gingue et al. | |
| 5,689,090 A | 11/1997 | Bleich et al. | |
| 5,698,323 A | 12/1997 | Keough et al. | |
| 5,744,757 A | 4/1998 | Kenny et al. | |
| 5,767,441 A | 6/1998 | Brorein et al. | |
| 5,770,820 A * | 6/1998 | Nelson et al. | 174/113 R |
| 5,814,768 A | 9/1998 | Wessels et al. | |
| 5,821,466 A | 10/1998 | Clark et al. | |
| 5,821,467 A | 10/1998 | O'Brien et al. | |
| 5,841,072 A * | 11/1998 | Gagnon | 174/110 F |
| 5,841,073 A | 11/1998 | Randa et al. | |
| 5,883,334 A | 3/1999 | Newmoyer et al. | |
| 5,936,205 A | 8/1999 | Newmoyer | |
| 5,956,445 A | 9/1999 | Deitz, Sr. et al. | |
| 5,990,419 A | 11/1999 | Bogese, II | |
| 6,074,503 A | 6/2000 | Clark et al. | |
| 6,140,587 A | 10/2000 | Sackett | |
| 6,147,309 A | 11/2000 | Mottine et al. | |
| 6,162,992 A | 12/2000 | Clark et al. | |
| 6,222,129 B1 * | 4/2001 | Siekierka et al. | 174/113 R |
| 6,222,130 B1 | 4/2001 | Gareis et al. | |
| 6,248,954 B1 | 6/2001 | Clark et al. | |
| 6,272,828 B1 | 8/2001 | Walling et al. | |
| 6,273,977 B1 | 8/2001 | Harden et al. | |
| 6,303,867 B1 | 10/2001 | Clark et al. | |
| 6,353,177 B1 | 3/2002 | Young | |
| 6,392,152 B1 | 5/2002 | Mottine, Jr. | |
| 6,403,887 B1 * | 6/2002 | Kebabjian et al. | 174/110 R |
| 6,437,248 B1 * | 8/2002 | Giebel | 174/110 R |
| 6,441,308 B1 | 8/2002 | Gagnon | |
| 6,570,095 B2 | 5/2003 | Clark et al. | |
| 6,596,944 B1 | 7/2003 | Clark et al. | |
| 6,639,152 B2 | 10/2003 | Glew et al. | |
| 6,686,537 B1 | 2/2004 | Gareis et al. | |
| 6,727,433 B2 * | 4/2004 | Tsai | 174/110 R |
| 6,743,983 B2 | 6/2004 | Wiekhorst et al. | |
| 6,787,694 B1 | 9/2004 | Vexler et al. | |
| 6,789,311 B2 | 9/2004 | Fidi et al. | |
| 6,812,408 B2 | 11/2004 | Clark et al. | |
| 6,815,611 B1 | 11/2004 | Gareis | |
| 6,888,070 B1 | 5/2005 | Prescott | |
| 6,998,537 B2 | 2/2006 | Clark et al. | |
| 7,015,397 B2 | 3/2006 | Clark | |
| 7,053,310 B2 | 5/2006 | Clark | |
| 7,084,348 B2 | 8/2006 | Dillon | |
| 7,135,641 B2 | 11/2006 | Clark | |
| 7,154,043 B2 | 12/2006 | Clark | |
| 7,179,999 B2 | 2/2007 | Clark et al. | |
| 7,193,155 B2 | 3/2007 | McMillan et al. | |
| 7,208,683 B2 | 4/2007 | Clark | |
| 7,244,893 B2 | 7/2007 | Clark | |
| 7,262,366 B2 | 8/2007 | Clark | |
| 7,271,343 B2 | 9/2007 | Clark | |
| 7,358,436 B2 * | 4/2008 | Dellagala et al. | 174/27 |
| 7,405,360 B2 | 7/2008 | Clark et al. | |
| 7,449,638 B2 | 11/2008 | Clark et al. | |
| 7,491,888 B2 | 2/2009 | Clark | |
| 7,534,964 B2 | 5/2009 | Clark et al. | |
| 2004/0256139 A1 | 12/2004 | Clark | |
| 2005/0056454 A1 * | 3/2005 | Clark | 174/113 R |
| 2006/0021772 A1 | 2/2006 | Dellagala et al. | |
| 2006/0207786 A1 | 9/2006 | Clark | |

FOREIGN PATENT DOCUMENTS

| | | |
|---|---|---|
| DE | 2555670 A | 6/1997 |
| EP | 0 380 245 B1 | 5/1994 |
| EP | 1296336 A1 | 8/2002 |
| GB | 361930 | 11/1931 |
| GB | 486970 | 6/1938 |
| GB | 2234389 A | 1/1991 |
| GB | 2 260 216 A | 7/1993 |
| JP | 5159628 A | 6/1993 |
| JP | 5325660 | 12/1993 |
| JP | 2000357417 | 12/2000 |
| WO | 9634400 A1 | 10/1996 |
| WO | 01/93281 A1 | 12/2001 |

\* cited by examiner

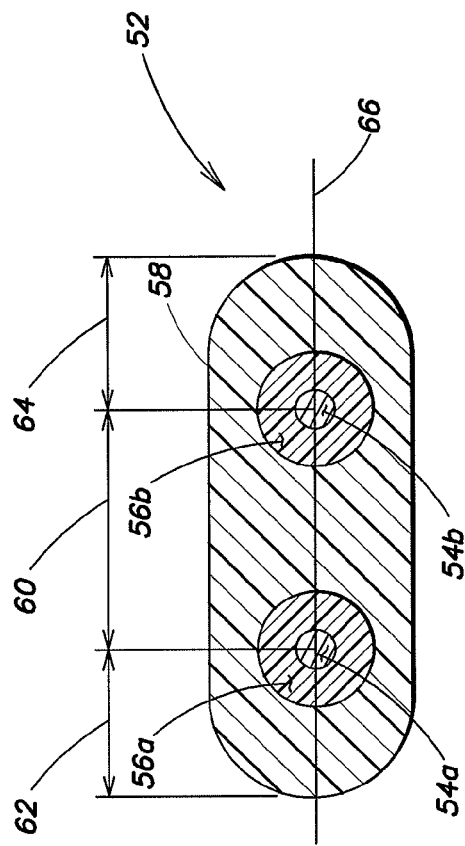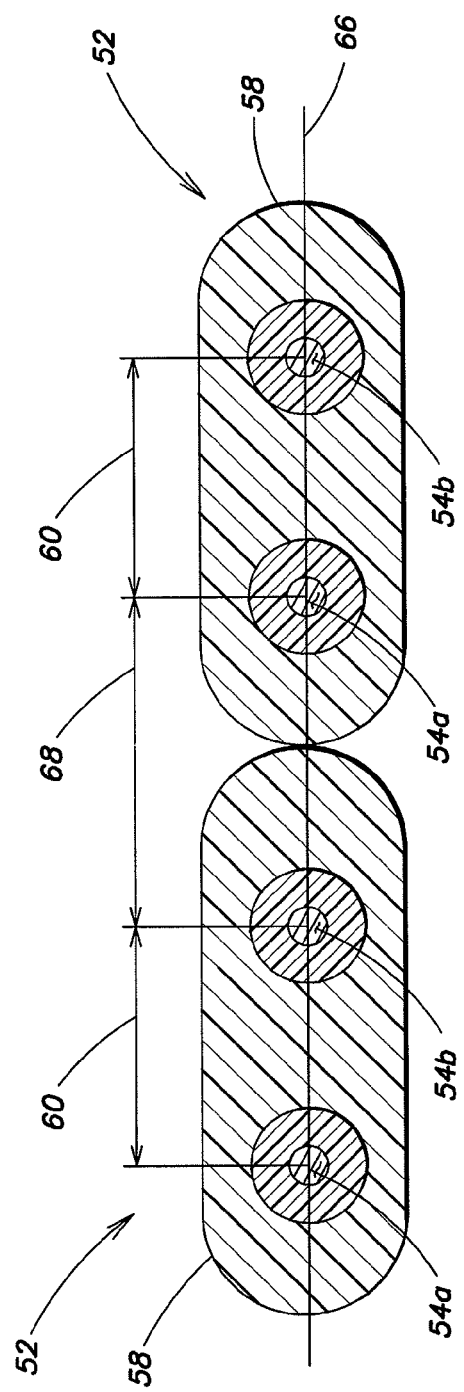

TELECOMMUNICATIONS CABLE

CROSS-REFERENCE TO RELATED APPLICATIONS

This application claims priority under 35 U.S.C. § 119(e) to U.S. Provisional Patent Application No. 60/846,142 filed Sep. 21, 2006 and entitled "Telecommunications Cable," which is herein incorporated by reference in its entirety.

BACKGROUND

1. Field of Invention

The present invention is directed to high speed data communications cables and transmission media used therein.

2. Discussion of Related Art

Telecommunication cable designs vary according to the role which the cables are meant to fulfill. In building design, it is always of paramount importance to take every precaution possible to resist the spread of flame and the generation of and spread of smoke throughout a building in case of an outbreak of fire. This clearly is a main aim as protection against loss of life and also to minimize the cost of the fire in relation to the destruction of electrical and other equipment. With this in mind, for cables designed for installation in plenum chambers of air circulation systems in buildings, care needs to be taken to ensure that the cables have maximum resistance to flame spread and also produce minimum amounts of smoke which reduces the chances of visibility becoming obscured, thereby greatly increasing the chances of people within the building finding their way to safety.

Conventional designs of data grade telecommunications cables for installation in plenum chambers have a low smoke generating jacket material, e.g. of a PVC formulation or a fluoropolymer material, surrounding a core of twisted conductor pairs, each conductor individually insulated with a fluorinated ethylene propylene insulation layer. The latter is a common choice for conductor insulation in this type of cable, due to its flame retardant, smoke retardant and good electrical properties and which is capable of satisfying recognized plenum test requirements such as the "peak smoke" and "average smoke" requirements of the UL910 Steiner test and/or CSA FT6 (plenum flame test) while enabling the cable to achieve a desired electrical performance under recognized test requirements EIA/TIA-568 and TSB-36 for high frequency signal transmission.

SUMMARY OF INVENTION

The use of fluorinated ethylene propylene is extremely expensive and may account for up to 60% of the cost of a cable designed for plenum usage.

On the other hand, in another design of telecommunications cable for in-building usage, such cables are not for use in plenum of air circulation systems, instead these cables are to be installed in risers in buildings extending from floor-to-floor. While it is recognized that flame spread in such a cable is important, nevertheless the production of smoke is not considered to be a major issue because it is unlikely that smoke from such a cable could reach populated areas within the building. As a result therefore, the conductors in a riser cable are not normally insulated with the expensive fluorinated ethylene propylene but are insulated with a less expensive material such as a flame retardant polyolefin. Cables with conductors insulated with flame retardant polyolefin could not satisfy the above discussed plenum test requirements. Clearly, therefore, no thought would be given to using flame retardant polyolefin as used in a riser design cable for a plenum cable because of the problems associated with the production of smoke in plenum cable designs.

According to at least one embodiment, there is provided a cable design suitable for in plenum chamber use while meeting all of the requirements for such use and in which the cable is less expensive than conventional cables for plenum chamber usage. In one example, a cable may comprise at least one twisted pair of insulated conductors, the twisted pair comprising two electrical conductors that are each individually insulated with a multi-layer insulation. In one example, the multi-layer insulation may be include two different fluoropolymer layers, and either layer may be non-solid (e.g., foamed).

In one embodiment, there is provided a telecommunications cable having a cable core comprising a plurality of electrical conductors each individually insulated with a dual layer of insulation having an inner layer of a flame retardant polyolefin and an outer layer surrounding the inner layer, the core being provided within a jacket of low smoke generating material. The outer layer may comprise fluorinated ethylene propylene (FEP) or another fluoropolymer or fluorocopolymer such as PFA, MFA, PVDF, ECTFE, PTFE, etc., in either their native solid states or as foamed.

Cables according to aspects and embodiments of the invention have been found to be suitable for in-plenum chamber usage. This is surprising in view of the fact that flame retardant polyolefin is used in the structure and this has previously been considered unsuitable for plenum chamber usage because of its known characteristic of generating opaque smoke during a fire. It has been discovered, however, in the inventive concept that the fluoropolymer or fluorocopolymer (e.g., FEP, PFA, MFA, PVDF, ECTFE, PTFE) outer layer in its flame spread resistant function, is sufficiently protective of the fire resistant polyolefin that flame contact with the flame retardant polyolefin and flame spread along the flame retardant polyolefin is dampened to such a degree that little or no opaque smoke is generated. This is even more surprising in that the flame retardant polyolefin and the fluoropolymer (or fluorocopolymner) such as fluorinated ethylene polypropylene are incompatible materials and do not adhere easily together. As a result, it could be imagined that the outer layer of fluorinated ethylene propylene (or other fluoropolymner or fluorocopolymer) would readily melt away thereby exposing the inner layer to excessive fire consumption and smoke generation. However this has not been found to be case, as the fluorinated ethylene propylene (or other fluoropolymner or fluorocopolymer) effectively dampens the flame spread and smoke generation created by the flame retardant polyolefin as discussed above. The degree of protection offered by the fluoropolymer or fluorocopolymer (eg., fluorinated ethylene propylene, PFA, MFA, PVDF, ECTFE, PTFE, etc.) outer layer to the fire retardant polyolefin must of course be dependent upon the thickness of the outer layer.

In at least one embodiment of a preferred cable, the fluorinated ethylene propylene (or other fluoropolymer or fluorocopolymer) layer has a minimum thickness of 2 mil to afford the required protection, the remainder of the insulated thickness being provided by the flame retardant polyolefin to produce the required electrical characteristics to the cable. In one example of a preferred arrangement, the inner layer of fire retardant polyolefin occupies at least 30% by volume of the total volume of the dual layer insulation. Cable designs having dual layer insulations for the conductors of a fluorinated ethylene propylene and fire retardant polyolefin have been successfully tested at ETL for the plenum flame test under UL910 Steiner requirements. The electrical characteristics of the cables have been evaluated and meet the requirements of EIA/TIA-568 and TSB36.

BRIEF DESCRIPTION OF THE DRAWINGS

Various embodiments and aspects of the invention will now be described, by way of example, with reference to the accompanying drawings, in which:

FIG. 7 is a cross-sectional view of another example of a twisted pair of conductors;

FIG. 8 is a cross-sectional illustration of two adjacent twisted pairs of conductors;

DETAILED DESCRIPTION

Figure 1:
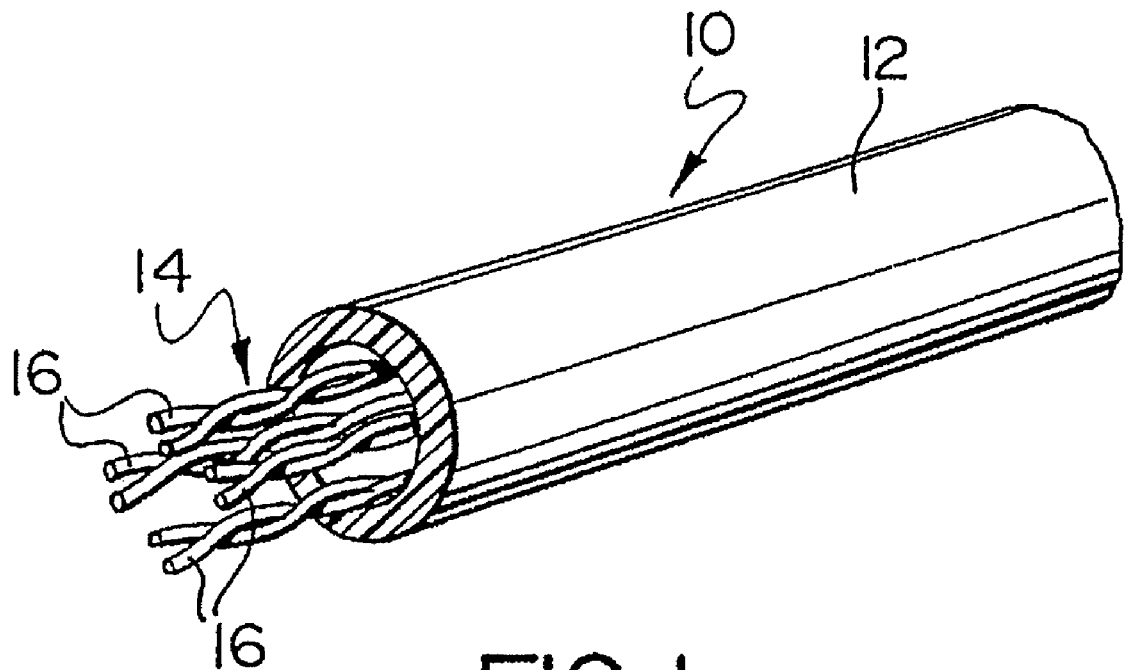
FIG. 1 is an isometric view of a cable according to the embodiment.

According to one embodiment shown in FIG. 1, a telecommunications plenum cable 10 suitable for high performance data transmission, comprises a jacket 12 of minimal smoke emission polyvinyl chloride or Halar fluoropolymer, the jacket surrounding a cable core 14 formed by a plurality, namely four, pairs of twisted together and individually insulated conductors 16.

Figure 2:
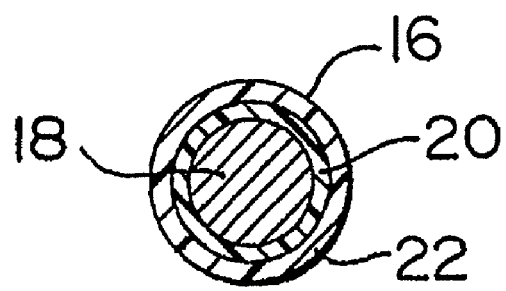
FIG. 2 is a cross-sectional view through an insulated conductor of the cable of FIG. 1.

As shown by FIG. 2, each individually insulated conductor 16 comprises a twenty-four AWG copper conductor 18 surrounded by a dual insulation. The dual insulation comprises an inner insulating layer 20 made from a flame retardant polyolefin e.g. polyethylene, and an outer layer surrounding the inner layer. The outer layer 22 may be formed from a fluoropolymer or fluorocopolymner such as fluorinated ethylene propylene, PFA, MFA, PVDF, ECTFE, PTFE, and the like. Examples of two types of MFA that may be used for the outer layer 22 in some embodiments of the invention include Hyflon® MFA 1041, a type of fluorocarbon, and Hyflon® MFA F1850-0010, a foamable fluoropolymer based on MFA 1041, both available from Solvay Solexis. Hyflon® MFA 1041 is a high extrusion speed resin designed to be used for insulation in plenum-rated data cables, such as LAN cables. Hyflon® MFA 1041 has extremely low attenuation, excellent fire characteristics, physical properties and processing properties, and very good electrical performance, making it an attractive choice for Category 6 cables. Cables manufactured with MFA 1041 insulation have met the TIA Category 6 standard as well as the fire performance requirements specified in the NFPA 90a ("Standard for Air-conditioning and Ventilating Systems"). MFA 1041 may be applied onto wire using tubing extrusion techniques similar to those used for other thermoplastic materials and as known to those skilled in the art. Table 1 below gives some typical properties for Hyflon® MFA 1041.

TABLE 1

HYFLON ® MFA 1041 TYPICAL PROPERTIES

| | Test Method | Typical Values SI Units | US Customary Units |
|---|---|---|---|
| Physical Properties | | | |
| Density | ASTM D 792 | 2.12-2.17 g/cm$^3$ | 132-135 lb/ft$^3$ |
| Melt Flow Index (372° C., 5 kg) | ASTM 1238 | 22-28 g/10 min | 22-28 g/10 min |
| Mechanical Properties | | | |
| Tensile @ 23° C. (73° F.) | ASTM D1708 | | |
| Stress at Break | | >20 MPa | >2,900 psi |
| Elongation at Break | | >275% | >275% |
| Modulus | 1 mm/min | 500-600-MPa | 72.5-87.0 kpsi |
| Impact, Charpy | | no break | no break |
| Hardness, Shore D | ASTM D2240 | 55-60 | 55-60 |
| Flex Life (0.3 mm film) | ASTM D2176 | 600-1,000 cycles | 600-1,000 cycles |
| Thermal Properties | | | |
| Melting Point | ASTM D3307 | 280-290° C. | 536-554° F. |
| Heat of Fusion | DSC | 18-26 J/g | 42-60 BTU/lb |
| Specific Heat @ 23° C. (73° F.) | DSC | 0.9-1.1 J/(g K) | 0.21-0.26 BTU/(lb° F.) |
| Linear Thermal Exp. Coefficient | ASTM D696 | 1.2-2 10$^{-4}$/° C. | 0.7-1.1 10$^{-4}$/° F. |
| Thermal Conductivity @ 40° C. (104° F.) | ASTM C177 | 0.2 W/(m K) | 1.2 BTU in/h ft$^2$ ° F.) |
| Electrical Properties | | | |
| Surface Resistivity | ASTM D257 | >10$^{17}$ Ohm | >10$^{17}$ Ohm |
| Volume Resistivity | ASTM D257 | >10$^{17}$ Ohm cm | >10$^{17}$ Ohm in |
| Dielectric Constant at 23° C. @ 1 MHz | ASTM D150 | 2.0 | 2.0 |

TABLE 1-continued

HYFLON ® MFA 1041 TYPICAL PROPERTIES

| | Test Method | Typical Values SI Units | Typical Values US Customary Units |
|---|---|---|---|
| @ 850 MHz | | 2.0 | 2.0 |
| @ 2.1 GHz | | 2.0 | 2.0 |
| Dissipation Factor at 23° C. | ASTM D150 | | |
| @ 1 MHz | | $2 \times 10^{-4}$ | $2 \times 10^{-4}$ |
| @ 850 MHz | | $2 \times 10^{-4}$ | $2 \times 10^{-4}$ |
| @ 2.1 GHz | | $9 \times 10^{-4}$ | $9 \times 10^{-4}$ |
| Dielectric Strength @ 50 Hz | ASTM D149 | 35-40 kV/mm | 900-1,000 V/mil |
| Fire Resistance | | | |
| UL Flammability Test | UL 94 | V-0 Class | V-0 Class |
| Oxygen Index | ASTM D2863 | 95% | 95% |
| Potential Heat | NFPA 259 | 970 J/g | 2,270 BTU/lb |

Hyflon® MFA F1850-0010 is a pre-compounded, foamable fluoropolymer based on MFA 1041 that is well suited for manufacturing primary insulation for shielded or unshielded twisted pairs. Hyflon® MFA F1850-0010 is typically foamed 40%-60% with closed cell voids, and may be generally recommended for wire constructions having a final wall thickness from about 0.005 inches (0.125 mm) to 0.025 inches (0.6 mm). The foaming level may be varied between about 20%-80% by controlling the temperature, Nitrogen rate, or adding natural MFA. Hyflon® MFA F1850-0010 may be foamed during extrusion by injection of an inert gas (e.g., Nitrogen) into the polymer melt using extrusion techniques similar to those used for other thermoplastic materials and as known to those skilled in the art. Table 2 below gives some typical properties for Hyflon® MFA F1850-0010.

TABLE 2

HYFLON ® MFA F1850-0010 TYPICAL PROPERTIES

| | Test Method | Typical Values SI Units | Typical Values US Customary Units |
|---|---|---|---|
| Physical Properties | | | |
| Density | ASTM D 792 | 2.12-2.17 g/cm³ | 132-135 lb/ft³ |
| Melt Flow Index (372° C., 5 kg) | ASTM 1238 | 22-28 g/10 min | 22-28 g/10 min |
| Thermal Properties | | | |
| Melting Point | ASTM D3307 | 280-290° C. | 536-554° F. |
| Heat of Fusion | DSC | 18-26 J/g | 42-60 BTU/lb |
| Specific Heat @ 23° C. (73° F.) | DSC | 0.9-1.1 J/(g K) | 0.21-0.26 BTU/(lb° F.) |
| Fire Resistance | | | |
| UL Flammability Test | UL 94 | V-0 Class | V-0 Class |
| Oxygen Index | ASTM D2863 | 95% | 95% |
| Potential Heat | NFPA 259 | 970 J/g | 2,270 BTU/lb |

Referring again to FIG. 2, in one embodiment, the inner layer has a thickness of about 3.5 mil and the outer layer has a thickness of approximately 3.5 mil. The two layers are provided by successive extrusion steps, possibly within a dual extrusion head of known structure. The two materials are likely incompatible and there is little or no adherence between the layers. In this embodiment it has been found that with the dual insulation thickness of 7.0 mil, the cable is entirely suitable for use in plenum chamber conditions. In the event of a fire, it has been determined that the flame spread characteristics are satisfactorily low as successfully tested at ETL and coming within the flame spread standards for plenum cable as set by the UL910 Steiner test. Electrical characteristics of the cable have been evaluated and it is believed that for high frequency performance the cable satisfactorily meets EIA/TIA-568 and TSB-36 standards.

Although the cable of at least one embodiment does not use fluorinated ethylene propylene, or a similar material (e.g., PFA, MFA, PVDF, ECTFE, PTFE, etc.) exclusively for its insulation, but instead uses flame retardant polyethylene as an inner layer to the outer layer of fluorinated ethylene propylene or similar material, nevertheless satisfactory results have been achieved. Surprisingly, although the flame retardant polyethylene conventionally is avoided for plenum cable constructions, in the invention and as shown by the embodiment it was shown that material is suitable as the inner layer insulation for plenum cables. The electrical properties were achieved as stated by the dual layer insulation as also were the flame retardant properties. Although the flame retardant polyethylene was incorporated, this incorporation was, of necessity as an inner layer of the dual insulation structure and in this position, it was found that the fluorinated ethylene propylene (or other fluoropolymer or fluorocopolymer) outer layer minimized the contact of flame with the inner layer and thereby controlled the degree of flame spread along the inner layer and also inhibited the generation of smoke by the polyethylene. This is a surprising result in that it could not have been previously supposed that flame retardant polyethylene could have been satisfactory under any circumstances for use as an insulation for plenum cables. The low smoke test results were also surprising in view of the fact that the two layers of insulation are not compatible and the view could have been taken that the lack of adhesion between the layers would have assisted in the flame spread along the flame retardant polyethylene. However, this has been found not to be the case that the incompatibility of the two materials produces a negligible result.

The UL910 Steiner test requirements are for a maximum flame spread of 5 ft. peak smoke lower than 0.5, and average smoke lower than 0.15. The cable of the embodiment under test conditions, produced a maximum flame spread of 0.9 ft. peak smoke of 0.394 and average smoke of 0.102.

In the above embodiment, the fluorinated polyethylene occupies approximately 44% by volume of the total volume of the dual layer insulation. It is believed that satisfactory results may be obtained while using a minimum of 30% by volume of the flame retardant polyethylene of the total volume of the insulation. In addition for the purpose of providing a protection against flame spread of the flame retardant polyethylene, the outer layer of fluorinated ethylene propylene or other fluoropolymer or fluorocopolymer (e.g., PFA, MFA, PVDF, ECTFE, PTFE, etc.) should have a minimum thickness of 2 mil. In other constructions falling within the scope of the present invention, the advantages expressed above also apply to different thicknesses of insulation with preferably the inner layer having a volume of at least 30% of the total volume of the dual layer insulation; it also applies to different conductor sizes, e.g. 22 AWG conductor. The total thickness of the insulation is comparable to the insulation of a totally fluorinated ethylene propylene insulation provided upon a 22 or 24 AWG conductor in a conventional plenum type telecommunications cable.

According to another embodiment, it may be desirable to provide the insulated conductors with a form of color-coding to allow one conductor (or twisted pair) to be identified or distinguished from another insulated conductor or twisted pair. For example, according to one embodiment, a colored stripe may be provided in (or on) either or both of the inner insulation layer and the outer insulation layer, or may be provided between the insulation layers. In one example, a colored stripe may be integrally extruded in either or both of the inner and outer insulation layers. In another example, a fine colored thread may be positioned between the inner and outer insulation layers. The thread may be formed of any organic or synthetic material. In one preferred example, the thread may be made of aramid (e.g., Kevlar™).

In addition to a cable meeting certain requirements for flame and smoke spread, it may also be important for a cable to meet other performance requirements, for example, with respect to crosstalk, return loss, characteristic impedance and skew. When twisted pairs are closely placed, as may be the case in a multi-pair cable, electrical energy may be transferred from one twisted pair to another. Such energy transferred between pairs is referred to as crosstalk and is generally undesirable. Crosstalk causes interference to the information being transmitted through the twisted pair(s) and can reduce the data transmission rate and cause an increase in the bit error rate. Providing the different twisted pairs in a cable with different twist lay lengths can help to reduce unwanted crosstalk between the pairs. However, the shorter a given pair's twist lay length, the longer the "untwisted length" of that pair and thus the greater the signal phase delay added to an electrical signal that propagates through the twisted pair. It is to be understood that the term "untwisted length" herein denotes the electrical length of the twisted pair of conductors when the twisted pair of conductors has no twist lay (i.e., when the twisted pair of conductors is untwisted). Therefore, using different twist lays among the twisted pairs within a cable may cause a variation in the phase delay added to the signals propagating through different ones of the conductors pairs. This phase delay or differential in the signal velocity amongst the pairs is referred to as "skew."

The propagation velocity of a signal through a twisted pair of insulated conductors is also affected by the dielectric constant of the insulating material used for that twisted pair. For example, using a so-called "faster" insulation, such as fluoroethylenepropylene (FEP), the propagation velocity of a signal through a twisted pair may be approximately 0.69 c (where c is the speed of light in a vacuum). For a "slower" insulation, such as polyethylene, the propagation velocity of a signal through the twisted pair may be approximately 0.66 c. Thus, both the insulation material used for the insulated conductors and the twist lay used for each twisted pair may affect the propagation velocity of electrical signals through the twisted pairs. In many applications it may be desirable to reduce or minimize the skew, particularly, for example, in cables used for high speed bi-directional data transmission. Therefore, in accordance with some aspects and embodiments of the invention, varying twist lays and insulation materials may be optimized to achieve closely matched signal velocities relative to the final twist lays of the cable to minimize skew within the cable.

As discussed above, the dual-layer insulation of at least one twisted pair, may comprise an inner insulation layer and an outer insulation layer. In one example, the inner insulation layer may be a polyolefin-based material, such as, for example, polyethylene's, polypropylenes, flame retardant polyethylene, and the like. The outer insulation layer may be, for example, FEP or another fluoropolymer or fluorocopolymer (e.g., PFA, MFA, PVDF, ECTFE, PTFE, etc.). As discussed above, using a fluoropolymer for the outer insulation layer may have advantages in terms of passing the Steiner Tunnel test so that the cable may be plenum rated. According to one embodiment, the thicknesses of the inner and outer insulation layers may be chosen according to factors such as relative cost of the materials and the smoke and flame properties of the materials. The ratio between the thickness of the inner insulation layer and the outer insulation layer may also be selected based on the dielectric constants of the material used for each layer and the desired overall effective dielectric constant for the dual-layer insulation. In one example, the insulation thicknesses may be optimized for a skew less than approximately 25 ns/100 meters. In summary, all parameters, including insulation material, twist lay length and insulation thickness, may be individually adjusted to obtain desired skew and return loss performance.

According to other embodiments of the invention, one or more twisted pairs in a cable, the twisted pairs being dual-insulated twisted pairs as discussed above, may include conductors that are bonded together. Thus, a twisted pair may comprise two dual-insulated conductors, such as those described above, that are bonded together to form the twisted pair. Several embodiments of such bonded-together, dual-insulated conductors are discussed below.

Figure 3:
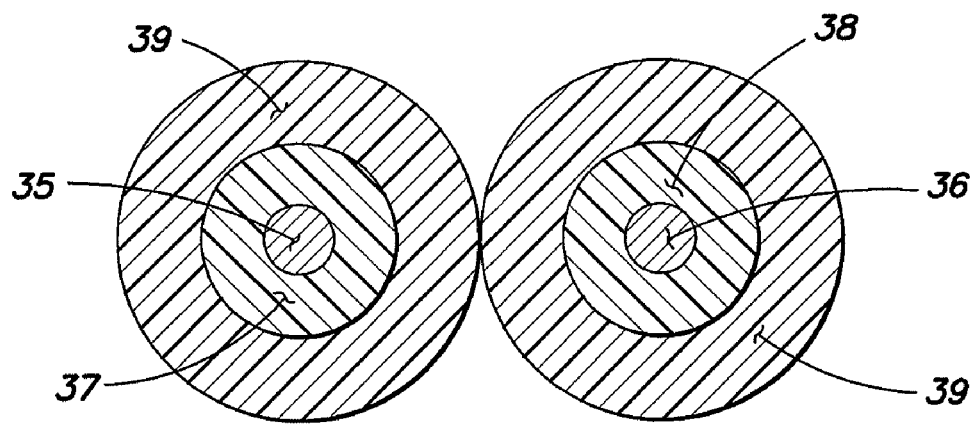
FIG. 3 illustrates a cross-sectional view one embodiment of dual-insulated, fixed together conductors.

Referring to FIG. 3, there is illustrated one embodiment of a twisted pair of conductors that can be used, for example, in high frequency applications. The two conductors 35, 36 can be any of solid, stranded, hollow or any other configuration known to those of skill in the art. For example, the conductors may be a solid metal, a plurality of metal strands, a fiberglass conductor, a layered metal or any combination thereof. Each conductor, 35, 36 is substantially insulated along its length by a respective first insulating layer 37, 38. In one embodiment, each of the conductors 35, 36 is disposed centrally within the corresponding first insulating layer 37, 38.

Each insulated conductor 35, 36, insulated by respective first insulations 37, 38, is also insulated along their length by a second insulation 39 to comprise dual-insulated conductors along their lengths. The insulated conductors are also formed so that that they are joined along their respective lengths in any suitable manner known to those of skill in the art. For example, for the embodiment illustrated in FIG. 3, the first and second insulated conductors are joined together along their respective lengths by the insulating layer 39, such that the second insulating layer fixes the first and second insulating conductors together. In other words, the second insulating layer 39 is formed, such as for example extruded, so that it joins the first and second insulated conductors.

Figure 4:
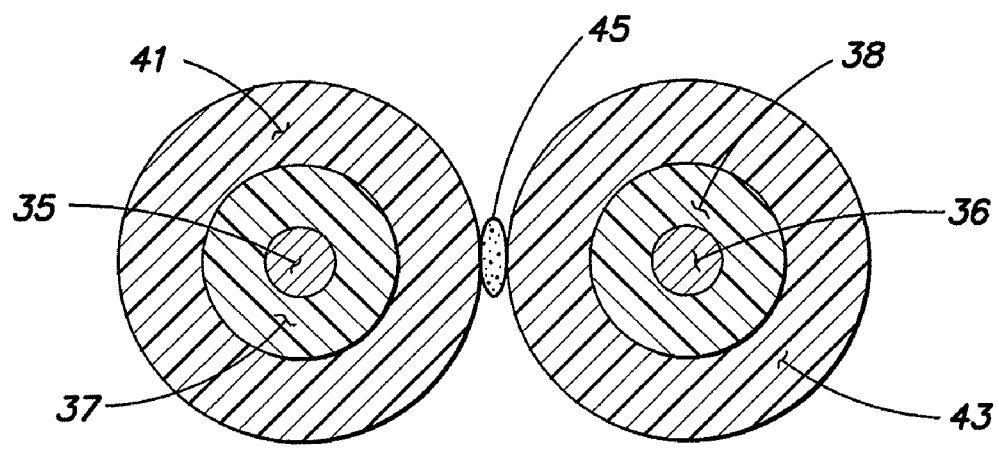
FIG. 4 illustrates a cross-sectional view of another embodiment of dual-insulated, fixed-together conductors.

FIG. 4 illustrates another embodiment of a dual-insulated, fixed together twisted pair. It is to be appreciated that like components are illustrated with like reference numbers. In this embodiment first and second insulated conductors 35, 36, insulated by respective first insulating layers 37, 38, are substantially insulated by additional second respective insulating layers 41, 43. The insulated conductors are also fixed together along their length by any appropriate bonding agent known to those of skill in the art. For example, the bonding agent may be any adhesive used in the industry. It is to be appreciated that in the embodiment of FIG. 4, the adhesive 45 is illustrated disproportionate to that which may typically be used, for purposes of illustration, and that the figure is not drawn to scale.

It is to be appreciated that the embodiments of FIG. 3 and FIG. 4 can be manufactured according to known manufacturing techniques used in the industry. For example, the insulated conductors 35, 36 are prepared by extruding insulating layers 37, 38 and 39 over the conductors 35, 36 and then adhering the insulated conductors together, for example, by causing the insulating material 39 to come together for each of the insulating conductors while the insulating material 39 is at an elevated temperature, prior to cooling, to provide a joined cable without the use of an adhesive. Alternatively, the insulated conductors 35, 36 are extruded with respective insulations 37 41 and 38 43, and brought together during the manufacturing process, for example, just after the extrusion of the insulating layers and fixed together with an adhesive or bonding agent 45 as illustrated in FIG. 4.

Accordingly, one embodiment of a method of manufacture of the twisted pairs of insulated conductors 35, 36 comprises extruding the first insulation material 37, 38 over the respective conductors, followed by extruding the second insulation material 39 over the insulated conductors 35, 36, and adhering the insulated conductors with the dual insulation layers together by contacting the first and second insulated conductors while the second insulation layer is at an elevated temperature, such that the insulated conductors affixed together when cooled. Alternatively, the method may also comprise introducing a bonding agent 45 between the dual-insulated conductors to affix the dual-insulated conductors together. The affixed insulated conductors can then be twisted at a desired twist lay to provide twisted conductors having a desired twist lay.

One embodiment of a cable comprising dual insulated conductors fixed to each other and twisted to form twisted pairs comprises high copper alloy conductors 35, 36, for example, that are 24 standard wire gauge (AWG). The first insulation layer 37, 38 insulating each conductor comprises a flame retardant polyolefin, such as polyethylene. The second insulation layer 39 insulating the insulation layers 37, 38 comprises a fluoropolymer or fluorocopolymer such as, for example, fluorinated ethylene propylene (FEP), PFA, MFA (e.g., the types of MFA described in the attached Appendices), PVDF, ECTFE, PTFE, and the like. The first insulating layer 37, 38 and the outer insulating layer 39 of FEP may have the same or different thicknesses. The cable may also comprise a jacket (not illustrated in FIGS. 3-4), for example of minimal smoke emission such as a polyvinyl chloride or a Halar fluoropolymer. In addition, the cable may also include at least one shield that substantially surrounds the twisted pairs of conductors and that is substantially enclosed by the jacket. For example, the shield may comprise a braid such as a braid of a high copper alloy or a metallic foil such as a copper alloy layer on an insulating base layer, that can be wrapped around the twisted pairs of conductors.

It is to be appreciated that although one embodiment of a cable comprising dual insulated, fixed together twisted pairs of conductors than can makeup a core of a cable has been described, various modifications to the conductors, the insulating materials, the shielding materials and the cable materials can be made and are contemplated by this disclosure. For example, the conductors 35, 36 may be constructed of any material used in the industry, and can be, for example, solid or stranded, a copper or copper alloy, a metal coated substrate, a silver, aluminum, a steel, alloys of different materials or a combination of any of the above. In addition, the first insulating material and the second insulating materials may be any insulating materials used for the insulation of conductors, such as polyvinyl chloride, polyethylene, polypropylene, flouropolymers, flouro-copolymers, cross-linked polyethylene and the like. In addition, the diameter of each of the conductors, 35, 36, can be, for example, anywhere in the AWG range between 18 to 40 AG. Further, the insulation thickness of the first insulating layers 37, 38 can be anywhere in a range from 0.001 inches to 0.030 inches. In addition, the insulating range of the second insulating layer 39, 41, 43 can be anywhere in a range from 0.001 inches to 0.030 inches. Further, the cable core can comprise any number of twisted pairs of insulated conductors.

Some of the advantages of the cable comprising the dual-insulated, fixed-together conductors include, for example, that each twisted pair of conductors has a center-to-center distance that does not vary by more than about <0.0005 to 0.001 inches. This results from the fixing of the conductors together such that the twisting of the conductors does not result in the variations discussed above with respect to the prior art. In addition, another advantage of such embodiments of the cable of this disclosure is that the dual insulated, fixed-together, twisted pairs of conductors can be pulled apart relatively easily, for example, after an initial cut, so that the cables can be pulled apart, stripped, and terminated in any standard connector in the industry. Another advantage of the dual insulated, fixed-together, conductors is that the dual insulation layer is left intact even with the pulling apart of the insulated conductors. Still another advantage of such embodiments of such a cable is that the dual insulated conductors can be separated, for example, for at least an inch from the end of a cable to facilitate the terminating a connector, but the remainder of the cable need not separated, and can remain intact with the desired twist lay.

Figure 5:
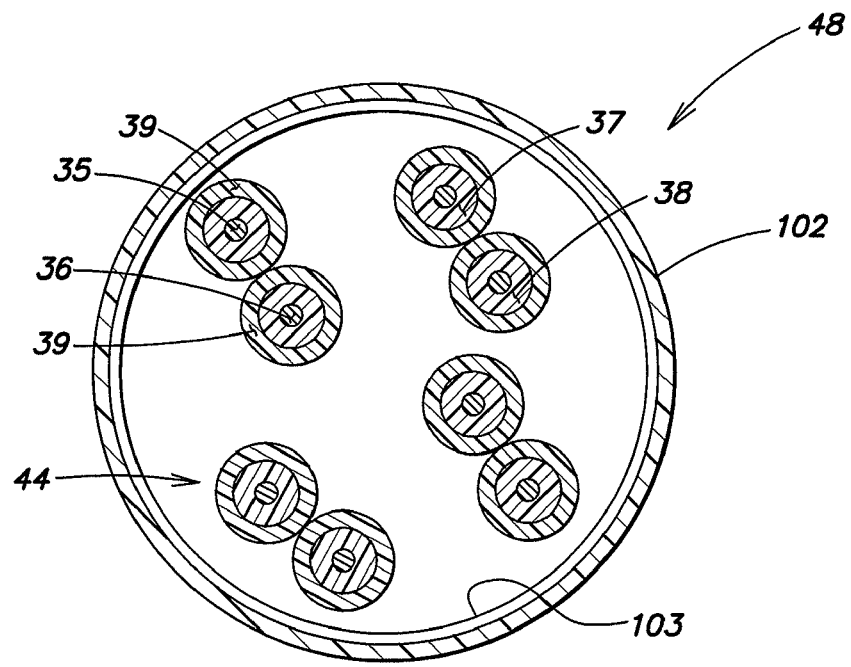
FIG. 5 is an illustration of a cross-section of one embodiment of a cable comprising a plurality of dual-insulated, fixed together twisted pairs of conductors.
Figure 6:
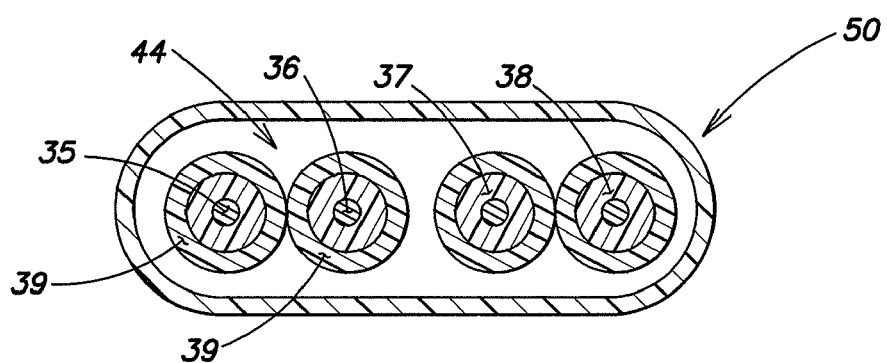
FIG. 6 is an illustration of a cross-section of another embodiment of a cable comprising dual-insulated, fixed together twisted pairs of insulated conductors.

It is to be appreciated that the cables described herein may be data, communications, or other high-performance cables and typically comprise a plurality of dual-insulated, fixed-together twisted pairs of conductors. Referring to FIG. 5, there is illustrated one embodiment of a cable comprising such dual-insulated, fixed-together insulated conductors. Each twisted pair includes two individual conductors 35, 36 that are substantially insulated by a first respective insulating layer 37, 38, and which are substantially insulated by a second insulated layer 39. The dual-insulated conductors are fixed together along their length as described above. The fixed-together, dual-insulated conductors are twisted about a common axis to form a twisted pair unit 44. The plurality of twisted pairs units are surrounded by a cable jacket 102 that may define the shape of the cable. The cable may be, for example, a substantially round cable 48, as illustrated in FIG. 5, or the twisted pairs of conductors may be disposed, for example, side-by-side in a flat cable 50, as illustrated in FIG. 6. However, it is to be understood that the invention is not limited in this regard and the cable may have any other shape used in the industry. The twisted pairs of conductors may be disposed in alternate arrangements within the cable jacket, as desired.

According to another embodiment of a cable, illustrated in FIG. 7, a twisted pair of insulated conductors 52 includes conductors 54a,b, each conductor individually insulated with a corresponding insulation 56a,b, to form insulated conductors. Both insulated conductors 54a,b are covered by a secondary insulating layer 58, to form the pair of conductors 52. The two conductors of the pair, and the surrounding insulations, are twisted about a common central axis to form the twisted pair of conductors 52. The insulation 56a,b surrounding conductors 54a,b may provide rigidity to the pair of conductors, and prevent deformation of the pair of conductors during twisting. The insulation may also control the distance between the conductors 54a,b and thus control the impedance of the cable. The insulation 56a,b is typically a solid layer to perform the functions described above, but may also be foamed in some applications.

Figure 9:
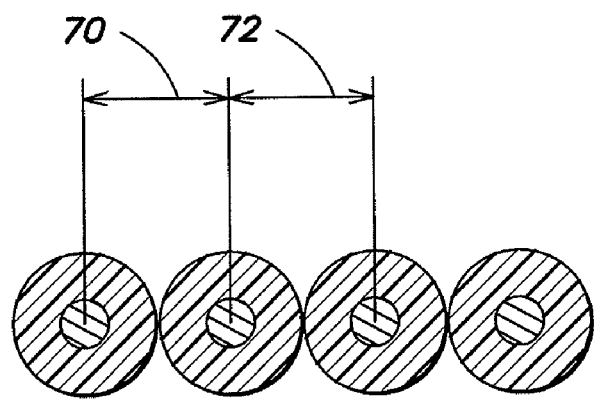
FIG. 9 is an illustration of two adjacent twisted pairs according to the prior art.

According to one example, the spacing 60 between the centers of the conductors 54a,b is less than the sum of the distances 62, 64 from the centers of conductors 54a,b to the edges of the insulating layer 58, measured along a reference line 66 that passes through the centers the conductors 54a,b. Stated another way, the conductors 54a,b may be separated by a distance 60 that is smaller than the distance 68 separating conductors 54a and 54b in adjacent pairs, when cables are adjacently arranged as illustrated in FIG. 8. By contrast, in the known art, illustrated in FIG. 9, the twisted pairs of conductors are centered in tubular insulation having a circular cross-section, and the separation 70 between the two conductors in a pair is substantially equal to the separation 72 between conductors in adjacent pairs.

An advantage to a pair of conductors as illustrated in FIG. 7 is that, while the impedance of individual pairs (e.g., FIG. 5, 44; FIG. 6, 44) of the proposed cable is equivalent to that of a conventional cable having identical conductor separation, the minimum separation distance (FIG. 8, 68) between adjacent pairs of one embodiment of the proposed cable exceeds the norm in a conventional cable. The higher separation between conductors of adjacent pairs produces tangible electrical performance improvements, such as reduced crosstalk between adjacent twisted pairs and lower signal attenuation. These reductions contribute to an improved signal-to-noise performance of the proposed cable.

Figure 10:
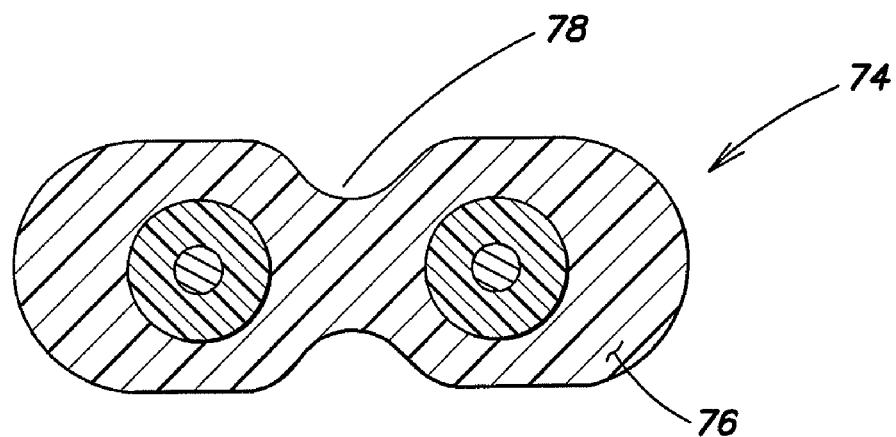
FIG. 10 is an illustration of a dual-insulated, fixed together twisted pair unit having a secondary insulating layer formed with an indentation.

In one embodiment as illustrated in FIGS. 7-8, the secondary insulation layer 58 may be uniformly formed such that the twisted pair unit has a flat oval shape. According to another embodiment, a twisted pair of conductors 74 may comprise a secondary insulation layer 76 that may be formed with an indentation 78, as illustrated in FIG. 10. In the illustrated example, the indentation is substantially centered between the two conductors, although it need not be. A cable comprising twisted pairs of conductors 74 has the same improved electrical performance characteristics as described above.

A cable comprising twisted pairs of conductors having any of the structure described above may have a number of advantages. The second insulation layer provides uniformity to the twisted pair of conductors, and facilitates twisting since there is no need to control the location and tension in two conductors. Rather, the two conductors of the pair are held in place within the pair unit by the second insulating layer, and thus only the single pair unit need be controlled. A less sophisticated twisting machine may therefore be used to perform the twisting, which may reduce the cost of the cable. A cable containing these twisted pairs may also be easier to terminate than a cable containing conventional twisted pairs. One reason for this is that the secondary insulating layer holds each conductor of the twisted pair in a known location relative to the other conductor and to the twisted pair unit. Therefore, there is no need to locate and/or control the tension or twist in two conductors, as is the case for conventional twisted pairs.

One mechanical characteristic of elastomers is their capacity to undergo relatively high strain in the elastic domain under relatively low mechanical stress and to achieve complete recovery following the release of the stress. Conversely, for high elastic modulus materials, there is typically a small strain domain where the material behaves elastically under relatively high stress; beyond that domain, high modulus materials may deform permanently or plastically.

According to one embodiment, the cable described herein takes advantage of the presence of an elastomer as the secondary insulating layer to create, during the twisting process and pair unit assembly, a structure that may be mechanically pre-stressed and may resist further deformations. For example, the elastomer layer may be readily deformed to effect a deformation that may be still in the elastic domain following the twisting process, and may resist further deformations. The elastomer layer may also cushion variations in the tension generated in the pair unit during spooling, which may result in better spooling and may facilitate twisting of the pair unit. The elastomer layer may also absorb variations in tension generated during twisting, thereby limiting dimensional variations to the thickness of the elastomer layer, which may help to stabilize the impedance of the cable.

Yet another advantage of a cable comprising some embodiments of the twisted pair units described above is that the flat oval shape of the twisted pair unit resists nesting, thereby helping to reduce crosstalk between twisted pair units in the cable. As discussed above, conventional twisted pairs typically have a figure-of-8 shape that has a wide natural groove that tends to cause nesting of the multiple twisted pairs in a cable. By comparison, the flat, oval shape of the twisted pair unit (FIG. 7, 52) described above resists nesting as the secondary insulating layer may be formed without a groove. The fact that the twisted pair units resist nesting also allows the twisted pair units to have a longer twist lay length which may be beneficial in terms of cost, and may allow a less sophisticated twisting machine to be used to perform the twisting.

As discussed above, the oval shape and eccentricity of the twisted pair units of the proposed cable described above reduces crosstalk between twisted pairs within the cable. Therefore, the proposed cable may have acceptably low levels of crosstalk without using a central separator. This is advantageous since, as discussed above, a central separator may increase the size, cost, and manufacturing complexity of a cable, and may cause increased alien crosstalk. Furthermore, for cables having an equal jacket thickness and tightness, the twisted pair units of the proposed design may be located closer to the center of the cable than they would be were a central separator used, meaning that they are inherently further away from twisted pairs in an adjacent cable. This may tend to reduce alien crosstalk between stacked cables, compared with conventional cables having a central separator. Alternatively, the outer diameter of the proposed cable may be reduced compared with a conventional cable having a central separator, since the twisted pairs may be more closely spaced within the cable. This may be advantageous in terms of cost and space required for installation of the cable.

According to another embodiment, the outer insulating layer may be used as a carrier for color, flame retardant or smoke retardant additives. This may be particularly advantageous for cables that are desired to be used in fire retardant applications. The insulating layer may incorporate inorganic flame retardant particles, or may be itself a flame retardant polymer. In yet another example, the outer layer of insulation may be foamed in order to reduce the signal attenuation of a twisted pair unit, and thus of a cable comprising such twisted pair units, since foaming may lower the dielectric constant of the layer by increasing the amount of air present in the layer. Foaming may also increase the compressibility of the outer insulation layer.

According to one embodiment, the cable comprising the dual-insulated, fixed together twisted pair may be an unshielded cable, as is illustrated in FIG. 5. In this example, the cable includes a plurality of twisted pair units 44, typically four, wrapped in a cable jacket 102 with no shielding around either the pair units themselves, or the cable as a whole. It is to be appreciated that while the illustrated cable has four twisted pairs in an exemplary configuration, the proposed cable is not so limited. Furthermore, the twisted pair units may have any secondary insulating layer as described herein.

In another embodiment, the cable may be a shielded cable, as is also illustrated in FIG. 5. A shielded cable can include a single shield or screen 103, that surrounds all of a plurality of twisted pair units 104, underneath the cable jacket 102. Typical prior art shielded cables may need larger insulated conductors in order to ensure that the shield is further away from the center wire of the conductors, so as to prevent the shield from interfering with the conductors, causing crosstalk. A shielded cable may be made from any of the twisted pairs units described above. An additional advantage of constructing a shielded cable using any of the twisted pair units as disclosed herein is that the twisted pair units may be inherently more rigid that conventional twisted pairs, and thus may tend to maintain their shape and facilitate the shield 103 being wrapped around them. The shield may be conductive, such as a conductive braid or a metallic foil, and may be supported by a polymer film. A drain wire may also be included in the cable jacket and may be connected to the shield.

According to yet another embodiment, the cable may be a fully shielded cable wherein each twisted pair unit 44 is also individually shielded with a shield (not illustrated), and an overall shield 103 is additionally applied underneath the cable jacket 102, and surrounding all of the plurality of twisted pair units. Fully shielded cables may be standard for CAT7 cables. Either or both of the individual shields and the additional overall shield may be conductive, and may be, for example, a conductive braid or metallic foil. The shields may be supported by polymer films.

Having thus described several aspects of at least one embodiment of this invention, it is to be appreciated various alterations, modifications, and improvements will readily occur to those skilled in the art. For example, any of the cables described herein may include any number of twisted pairs and any of the jackets, insulations and separators shown herein may comprise any suitable materials. In addition, the separators may be any shape, such as, but not limited to, a cross- or star-shape, or a flat tape etc., and may be positioned within the cable so as to separate one or more of the twisted pairs from one another. Such and other alterations, modifications, and improvements are intended to be part of this disclosure and are intended to be within the scope of the invention. Accordingly, the foregoing description and drawings are by way of example only and the scope of the invention should be determined from proper construction of the appended claims, and their equivalents.

What is claimed is:

1. A telecommunications cable comprising:
   a plurality of twisted pairs of electrical conductors, each twisted pair including a first electrical conductor and a second electrical conductor helically twisted together to form the twisted pair; and
   a jacket surrounding the plurality of twisted pairs of electrical conductors along a length of the telecommunication cable, the jacket comprising a low smoke generating material;
   wherein the first and second electrical conductors are insulated with a dual layer insulation having an inner layer of flame retardant polyolefin and an outer layer of foamed MFA surrounding the inner layer.

2. The telecommunications cable of claim 1, wherein the first and second electrical conductors are bonded together.

3. The telecommunications cable of claim 1, wherein at least one of the inner layer and the outer layer of the dual layer insulation comprises a colored stripe.

4. The telecommunications cable of claim 3, wherein the colored stripe is integrally extruded with at least one of the inner layer and the outer layer of the dual-layer insulation.

5. The telecommunications cable of claim 1, further comprising a colored thread positioned between the inner layer and the outer layer of the dual-layer insulation of at least one of the first and second electrical conductors.

6. The telecommunications cable of claim 5, wherein the colored thread comprises aramid.

7. The telecommunications cable of claim 1, wherein the outer layer has a minimum thickness of 2 mils.

8. A telecommunications cable comprising:
   a plurality of twisted pairs, each twisted pair comprising two conductors and having a multi-layer insulation;
   wherein the multi-layer insulation comprises a first layer that individually surrounds each of the two conductors, and a second layer that surrounds the first layer;
   wherein the first layer comprises a first fluoropolymer;
   wherein the second layer comprises a second fluoropolymer; and
   wherein the first and second fluoropolymers are different fluoropolymer materials.

9. The telecommunications cable of claim 8, wherein at least one of the first and second fluoropolymers is foamed.

10. The telecommunications cable as claimed in claim 8, wherein the second fluoropolymer comprises MFA.

11. The telecommunications cable as claimed in claim 8, wherein the second fluoropolymer comprises PFA.

12. The telecommunications cable as claimed in claim 8, wherein the second fluoropolymer comprises PVDF.

13. The telecommunications cable as claimed in claim 8, wherein the second fluoropolymer comprises ECTFE.

14. The telecommunications cable as claimed in claim 8, wherein the second fluoropolymer comprises PTFE.

15. A telecommunications cable comprising:

a plurality of twisted pairs of electrical conductors, each twisted pair including a first electrical conductor and a second electrical conductor helically twisted together to form the twisted pair; and a jacket surrounding the plurality of twisted pairs of electrical conductors along a length of the telecommunication cable, the jacket comprising a low smoke generating material;

wherein the first and second electrical conductors are insulated with a dual layer insulation having an inner layer of flame retardant polyolefin and an outer layer of foamed PFA surrounding the inner layer.

16. A telecommunications cable comprising:

a plurality of twisted pairs of electrical conductors, each twisted pair including a first electrical conductor and a second electrical conductor; and a jacket surrounding the plurality of twisted pairs of electrical conductors along a length of the telecommunication cable, the jacket comprising a low smoke generating material;

wherein the first and second electrical conductors are insulated with a dual layer insulation having an inner layer of flame retardant polyolefin and an outer layer of PVDF surrounding the inner layer.

17. A telecommunications cable comprising:

a plurality of twisted pairs of electrical conductors, each twisted pair including a first electrical conductor and a second electrical conductor; and a jacket surrounding the plurality of twisted pairs of electrical conductors along a length of the telecommunication cable, the jacket comprising a low smoke generating material;

wherein the first and second electrical conductors are insulated with a dual layer insulation having an inner layer of flame retardant polyolefin and an outer layer of ECTFE surrounding the inner layer.

18. A telecommunications cable comprising:

a plurality of twisted pairs of electrical conductors, each twisted pair including a first electrical conductor and a second electrical conductor; and a jacket surrounding the plurality of twisted pairs of electrical conductors along a length of the telecommunication cable, the jacket comprising a low smoke generating material;

wherein the first and second electrical conductors are insulated with a dual layer insulation having an inner layer of flame retardant polyolefin and an outer layer of PTFE surrounding the inner layer.

\* \* \* \* \*